United States Patent

Baziuk

[11] Patent Number: 5,722,113
[45] Date of Patent: Mar. 3, 1998

[54] VACUUM TRUCK WITH AIR FILTER FORMED FROM LENGTHS OF CHAIN

[75] Inventor: Morris Baziuk, Winnipeg, Canada

[73] Assignee: Flush Quip Inc., Winnipeg, Canada

[21] Appl. No.: 389,507

[22] Filed: Feb. 16, 1995

[51] Int. Cl.$^6$ ............................................. A47L 9/10
[52] U.S. Cl. ............... 15/352; 15/340.1; 15/347; 55/356; 55/358; 55/522
[58] Field of Search ............... 15/340.1, 340.2, 15/340.3, 347, 352; 55/356, 358, 522, 525

[56] References Cited

U.S. PATENT DOCUMENTS

| | | | |
|---|---|---|---|
| 587,560 | 8/1897 | Roberts | 55/421 |
| 731,953 | 6/1903 | Roberts | 55/522 X |
| 2,873,001 | 2/1959 | Gerdman | 55/522 X |
| 5,210,678 | 5/1993 | Lain et al. | 96/97 X |

FOREIGN PATENT DOCUMENTS

| 28559 | 3/1925 | France | 55/522 |
|---|---|---|---|

*Primary Examiner*—Chris K. Moore
*Attorney, Agent, or Firm*—Adrian D. Battison; Murray E. Thrift

[57] ABSTRACT

A vacuum truck includes a storage tank mounted on the truck frame and a vacuum pump for drawing air into the storage so that a vacuum hose extending from material to be excavated to an inlet of the storage tank carries the material into the tank for discharge from the air prior to passage of the air to vacuum pump. A filter system is provided in the ducting between the storage tank and the vacuum pump to extract particles and moisture from the air. The filter system includes a chamber attached along one side of the cylindrical storage tank with that chamber having a plurality of curtains attached to an upper wall of the chamber and suspended vertically across the chamber. Each curtain is formed from a plurality of chain lengths suspended by a top link of the chain to a bracket at the top wall of the chamber. The lengths are arranged side by side to form a full curtain across the width and height of the chamber. As the lengths of chain are attached only at the upper wall, they are free to dance as the vehicle is transported from place to place and move away from the bottom surface of the chamber when the chamber is tilted with the storage tank for discharge of material. The dancing action provides a self-cleaning effect on the chain filters with the material dropping to the bottom wall and as the chains move away from the bottom wall in the tilting action the material is free to slide to a discharge opening at the rear of the chamber.

20 Claims, 4 Drawing Sheets

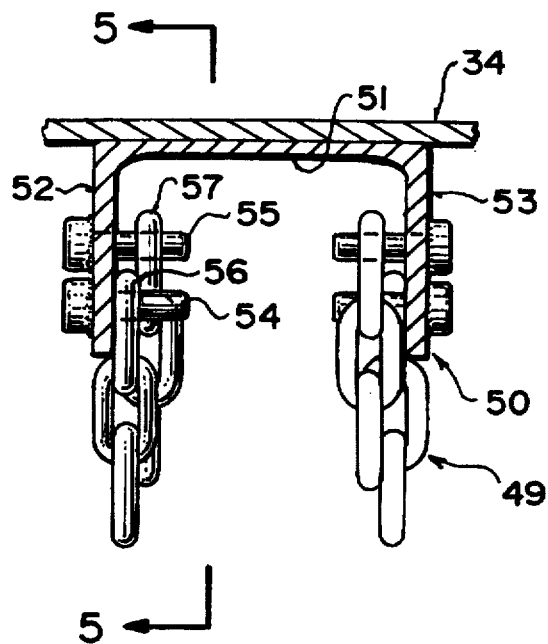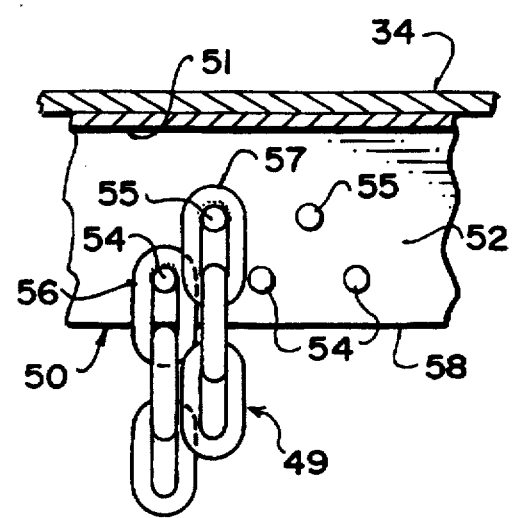
FIG. 4     FIG. 5
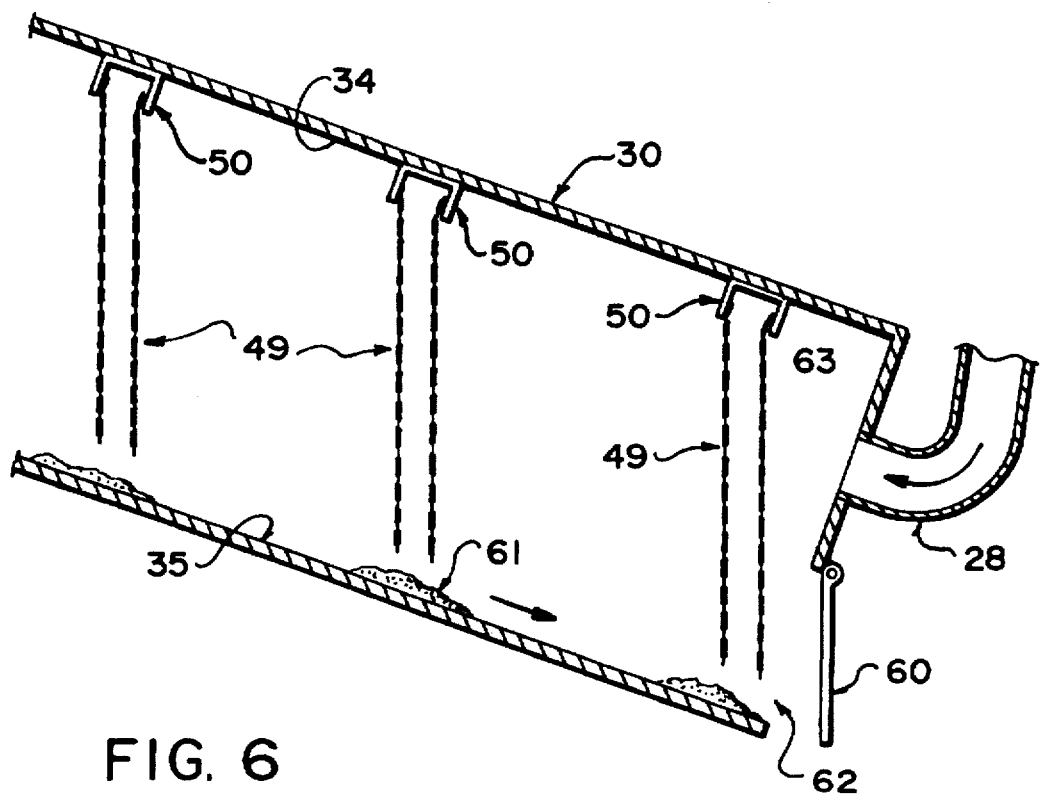
FIG. 6

VACUUM TRUCK WITH AIR FILTER FORMED FROM LENGTHS OF CHAIN

BACKGROUND OF THE INVENTION

This invention relates to an air filter and more particularly but not exclusively to a vacuum truck which uses an air filter to extract particles and moisture from the air prior to passage through the vacuum pump.

Vacuum trucks are well-known and widely used for excavation or extraction of particulate material by vacuum from an area to be cleared, with the material collected being transported through a vacuum hose into a storage tank from which the material is separated before the air enters the vacuum pump.

One problem which arises with vacuum trucks of this type is that it is necessary to extract all of the particles and moisture from the air before it is allowed to enter the vacuum pump. In order to generate the high levels of vacuum required, the vacuum pump is generally of a type requiring high tolerances between the moving parts and accordingly the pump can not tolerate moisture or particles in the air as it passes through the pump without dramatically increasing the amount of wear on the pump and thus reducing its life.

Considerable attention has therefore been given to techniques for extracting the particles and moisture from the air after the air emerges from the storage tank.

An initial separation of the bulk of the material from the air in the storage tank is relatively straight forward and generally is effected by a cyclone or by guide surfaces within the storage tank which allow the material to drop from the air as the air is rotated or the air speed slows. However moisture and smaller particles generally remain to some extent in the air stream as it is extracted from the storage tank at the air outlet. These particles and moisture must be extracted from the air. Various techniques have been proposed for this filter effect and usually the filter includes fabric surfaces through which the air passes. However the presence of moisture is a problem to the fabric filter medium and in addition the filter medium is often difficult to clean.

SUMMARY OF THE INVENTION

It is one object of the present invention, therefore, to provide an improved air filter.

It is a second object of the present invention to provide an improved vacuum truck including an air filter which more effectively extracts dust and moisture in a manner which allows the filter medium to be rapidly and simply cleaned with little or no operator involvement.

According to the invention, therefore, there is an apparatus for filtering air comprising a duct, means for directing the air along the duct from a feed end to a discharge end and a plurality of air permeable curtains arranged at spaced positions along the duct, each curtain extending substantially fully across the duct so that the air flowing along the duct passes through the curtain, each curtain comprising a plurality of lengths of chain with one end of each length supported in the duct in a row of said one ends and said lengths extending from said one ends in a direction across the duct.

According to a second aspect of the invention there is provided a vacuum truck comprising a truck frame mounted on ground wheels, a vacuum pump mounted on the truck frame for generating an air flow through the pump to form a vacuum inlet on one side of the pump and an air outlet on an opposed side of the pump, a vacuum hose for communicating vacuum air flow from the vacuum inlet of the pump to a material to be vacuumed at an inlet end of the vacuum hose, a storage tank having an air inlet connected to an outlet end of the vacuum hose for extracting the material from the vacuum air flow and air outlet, and an air filter connected between the air outlet of the storage tank and the vacuum inlet of the pump for extracting particles and moisture from the air prior to passage through the pump, the air filter comprising a duct, means for directing the air along the duct from a feed end to a discharge end and a plurality of air permeable curtains arranged at spaced positions along the duct, each curtain extending substantially fully across the duct so that the air flowing along the duct passes through the curtain, each curtain comprising a plurality of lengths of chain with one end of each length supported in the duct in a row of said one ends and said lengths extending from said one ends in a direction across the duct.

The filter using the lengths of chain surprisingly has a sufficient filtration effect to extract both particles and moisture from the air. The air emerging from the filter duct after passage through the plurality of the chain curtains is sufficiently cleaned of particles to allow passage through the pump. In some cases additional moisture collection may be necessary using conventional techniques.

The chain filter technique has the advantage that, when used in the truck, the chain filter medium is self-cleaning due to the vibration of the truck in transportation. The chains tend to dance in the duct as the duct is rigidly mounted to the truck frame thus releasing the particles from the chain to the duct floor.

The arrangement has the yet further advantage that the duct can be cleaned by the discharge of the filtered materials simply by tilting the duct so that the bottom wall is inclined toward the discharge end of the bottom wall and, with the chain lengths attached only to the upper wall, the chain lengths simply tilt away from the bottom wall allowing the material freedom to slide along the bottom wall to the discharge end.

One embodiment of the invention will now be described in conjunction with the accompanying drawings in which:

BRIEF DESCRIPTION OF THE DRAWINGS

FIG. 4 is a cross-sectional view along the lines 4—4 of FIG. 3 on an enlarged scale.

FIG. 5 is a view along the lines 5—5 of FIG. 4.

FIG. 6 is a side view of the filter tank only with one side wall removed and showing the tank in the tilted condition for discharge of collected materials.

In the drawings like characters of reference indicate corresponding parts in the different figures.

DETAILED DESCRIPTION

Figure 1:
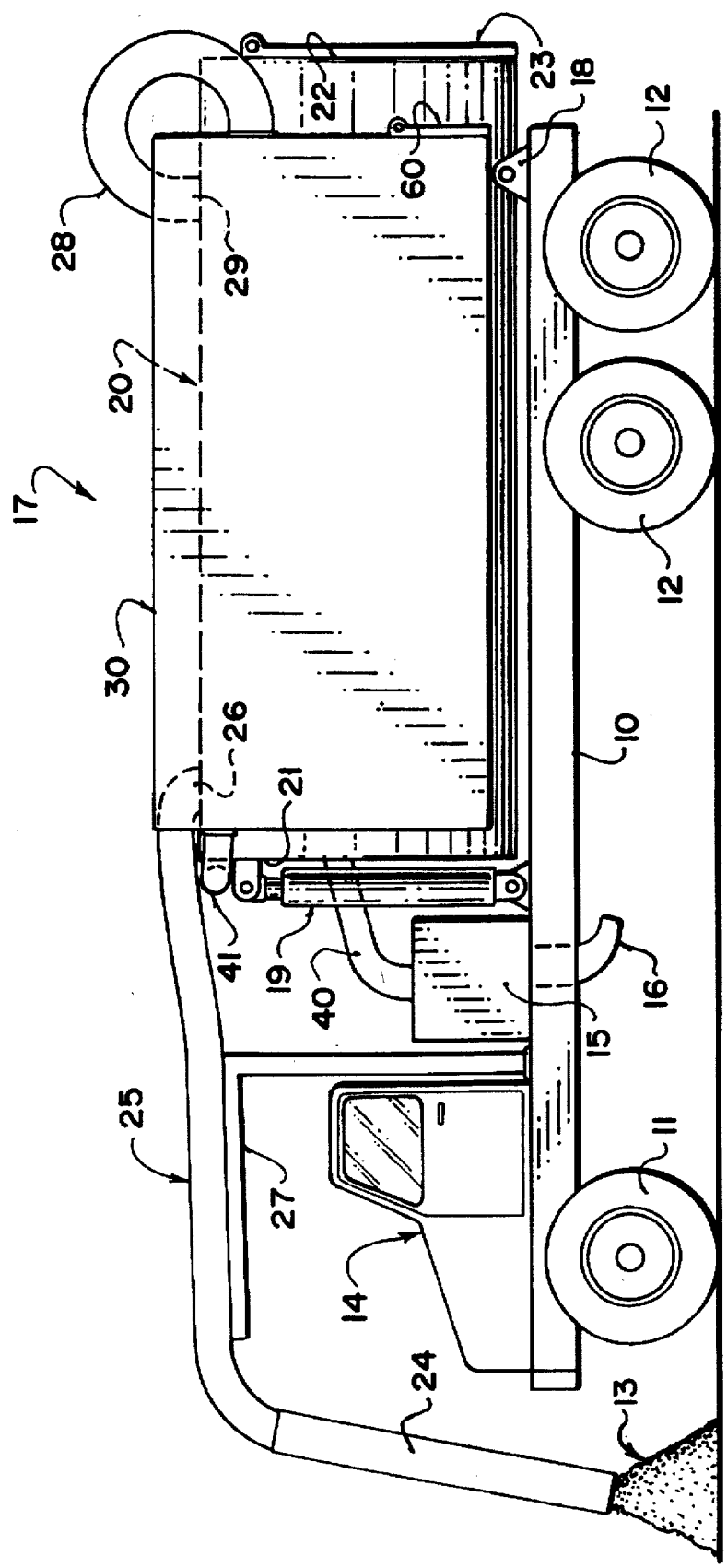
FIG. 1 is a schematic side elevational view of a vacuum truck according to the present invention.
Figure 2:
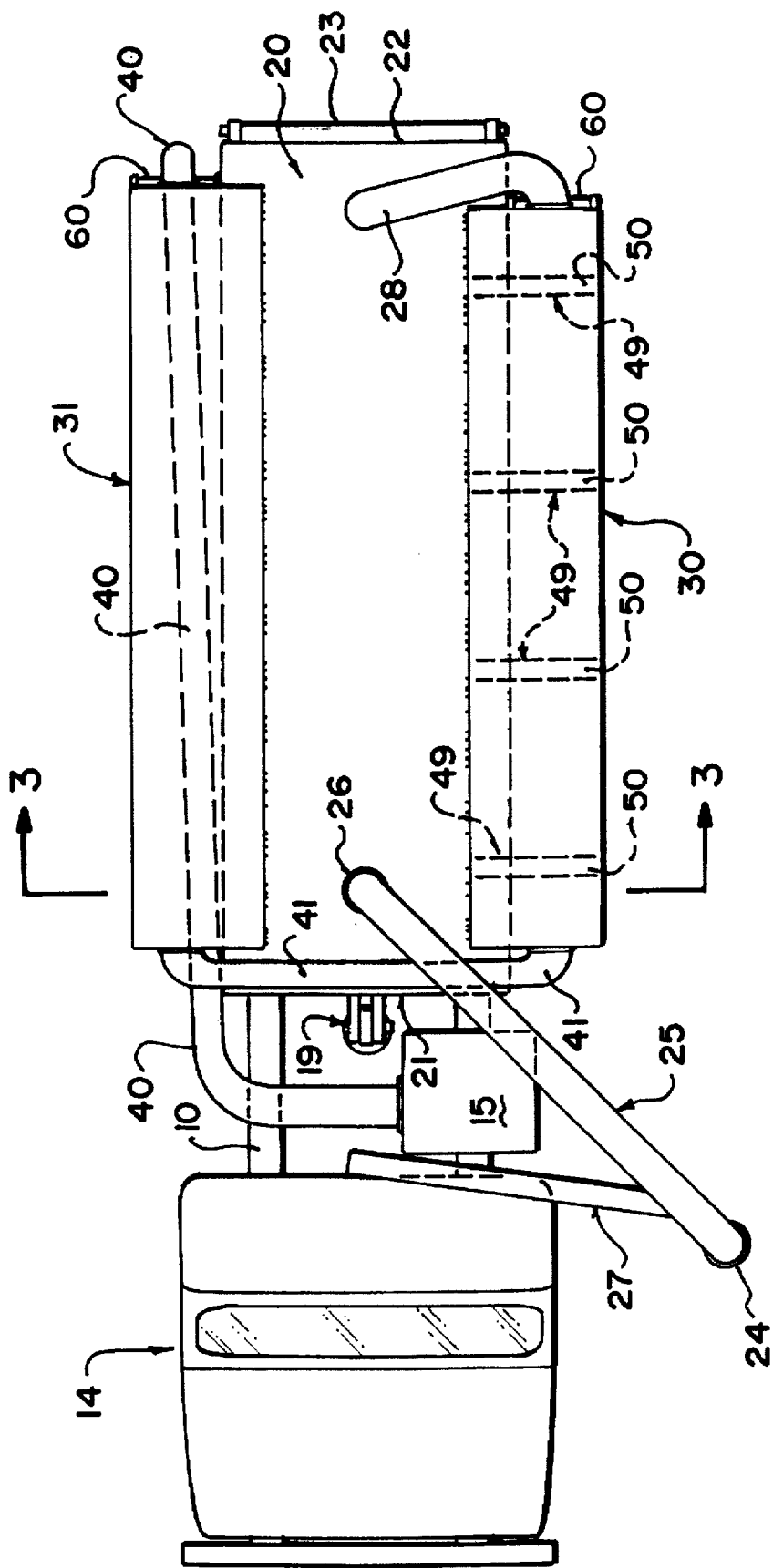
FIG. 2 is a top plan view of the vacuum truck of FIG. 1.
Figure 3:
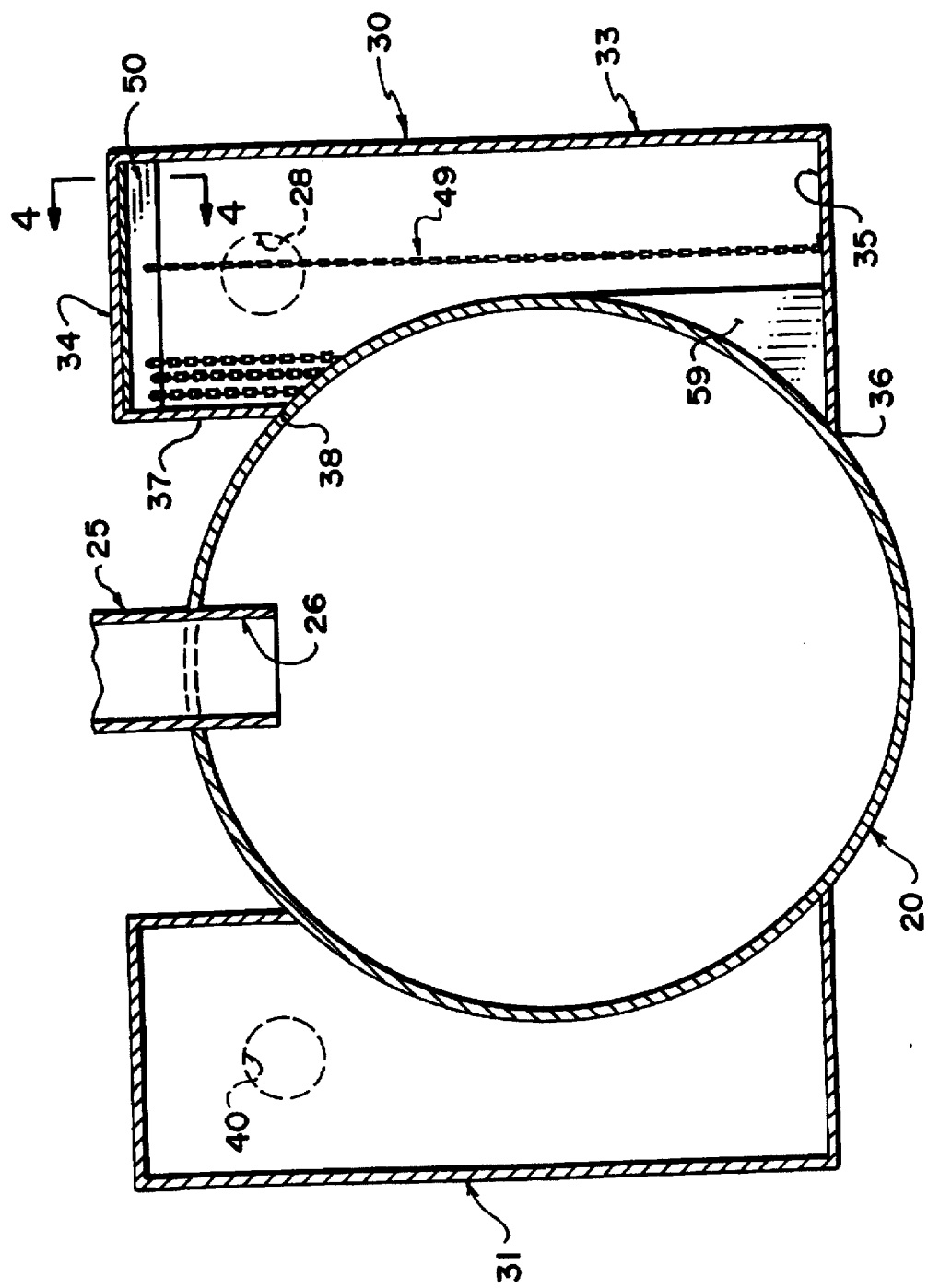
FIG. 3 is a cross-sectional view along the lines 3—3 of FIG. 2.

The vacuum truck of FIGS. 1 and 2 comprises a truck frame 10 mounted on ground wheels 11 and 12 for movement across the ground for transporting the vacuum system from place to place for effecting excavation or extraction of materials 13 from a location to be removed. The frame of the truck including a cab 14 and drive systems is entirely conventional and therefore will not be described in detail herein.

The truck carries a vacuum pump 15 again of a conventional nature of the type which generates a high level of vacuum and high air throughput. Such pumps are well-known and are conventionally available but generally require high tolerances in manufacture which reduce the ability of the pump to tolerate moisture or particles in the air drawn into the pump and discharged through a discharge duct 16 for disposal.

The system further includes a material storage tank and filter system generally indicated at 17 all of which are mounted as a common structure on rear hinges 18 adjacent the rear of the frame 10 so that the tank and filter system can be tilted about a horizontal axis defined by the hinges 18 by a front lift cylinder 19. Again the hinges and cylinder are of a conventional nature and readily available from various manufacturers. The lift cylinder can effect tilting of the main storage tank and filter system to a height sufficient to exceed the repose angle of the material stored within the tank so that it is readily discharged from the tank and from the filter system at the real of the tank and filter system.

The filter tank and storage system comprises a main central tank 20 which is of circular cylindrical shape extending from a forward end 21 at the cylinder 19 to a rearward end 22 at which is located a discharge door 23.

The vacuum system further includes an inlet hose 25 which has a rigid front portion 24 mounted on a boom 27 for movement from place to place to effect lifting of the material 13. The hose 25 extends to an inlet opening 26 on the top wall of the tank 20 so that air carried along the hose 25 carries the material 13 in suspension within the airflow until the air enters the storage tank 20 at the inlet opening 26 at which time the velocity in the air is dramatically decreased allowing the transported material to be discharged or dumped from the airflow and deposited in the base of the storage tank. Various baffle arrangements or cyclones may be used within the storage tank to effect extraction of as much as possible of the particles and moisture from the air before the air is drawn out of the storage tank through an outlet 28 at an outlet opening 29. The baffles within the tank again are of a conventional nature and are therefore not shown or described herein. The baffles are arranged to extract the particles and moisture from the air and to deposit those materials in the base of the storage tank for collection and for subsequent discharge through the discharge door 23 when the tank is tilted.

However the simple storage tank system is not sufficient to extract all of the particles and moisture from the air to a sufficient extent to allow the air withdrawn from the storage tank at the outlet opening 29 to be returned directly to the vacuum pump 15.

It is conventional, therefore, to provide a filter system carried on the main storage tank for filtering further particles and moisture from the air before it is returned to the vacuum pump 15.

For this purpose the storage tank carries two filter compartments 30 and 31 each mounted along a respective side of the storage tank. Thus each filter compartment has a vertical outside wall 33, a horizontal top wall 34 and a horizontal bottom wall 35. The horizontal bottom wall 35 is arranged above the bottom of the storage tank 20 and extends from a bottom edge of the vertical wall 33 to an inner edge 36 which is welded to the storage tank. From the horizontal top wall 34, a vertical wall 37 extends downwardly and is welded to the tank 20 at a bottom edge 38. This structure therefore forms a generally rectangular filter housing or chamber with one portion of the main storage tank 20 projecting into the rectangular chamber.

Thus the storage and filter system includes the main storage tank 20, the filtration chamber 30 and the filtration chamber 31. These chambers are interconnected by ducting so that air is drawn into the vacuum pump 15 through a first duct 40 which connects to a rear end of the chamber 31. A second duct interconnects a forward end of the chamber 31 to a forward end of the chamber 30. The third duct 28 previously described interconnects the outlet opening 29 of the main storage tank with the rear end of the chamber 30. Thus the vacuum pump draws air in a path from the inlet hose 25 into the tank 20 in which the main bulk of the transported materials 13 is discharged, from the tank 20 into the rear end of the chamber 30, along the chamber 30, from the front end of the chamber 30 to the front end of the chamber 31, along the chamber 31 and from the rear end of the chamber 31 to the vacuum pump 15.

The above description is basically conventional and the improvement with which the present invention is concerned relates to the construction of the filter chamber 30 and its filtration system.

The filter chamber 30 contains a plurality of separate curtains 49 of chain filters. Each curtain is formed from a U-shaped support bracket 50 welded to the top wall 34 and extending across the full width of the chamber. The U-shaped bracket 50 has an upper web 51 and two depending side walls 52 and 53. Each side wall carries a plurality of lengths of chain with an uppermost link of each length being attached to the respective side wall. Each side wall has a plurality of pins 54, 55 projecting through the side wall from a head on an outer side of the side wall inwardly into the interior of the U-shaped channel member. Each pin has welded to it an uppermost one 56, 57 of a respective length of chain. It will be noted that the pins 54 are arranged in a first row closer to a bottom edge 58 of the side wall and the pins 55 are arranged in an upper row and staggered in between the pins 54. In addition as shown in FIG. 4, the uppermost link 56 on the pin 54 is arranged immediately adjacent the inside surface of the side wall whereas the link 57 is spaced inwardly along the pin 55. This allows the chain lengths to be slightly overlapped so as to bring the chain lengths as close as possible together without interference between the uppermost links and the adjacent pins.

The lengths of chain are suspended from the bracket 50 and extend downwardly across the full height of the chamber. Thus some of the lengths extend downwardly only to the outside surface of the storage tank 20 whereas some of the lengths extend downwardly to the bottom surface 35. in this way a full curtain across the full width and the full height of the chamber is formed by the plurality of lengths of chain. the chains lie immediately adjacent one another and slightly overlapping so as to provide a curtain which allows the air to pass through the links of the chain but the overlapping links form a labyrinth causing the air to flow around the links and leaving in effect no direct passage for the air.

The chamber is closed at each curtain 49 by a generally triangular plate 59 which is welded between the bottom surface 35 and the lower part of the protruding portion of the tank 20 which extends into the chamber 30.

While various dimensions of chain can be used, one practical example provides links which are of the order of 2.0 to 2.5 inches in length and of the order of 1.0 to 1.25 inches in transverse width. In such an arrangement, the links are slightly overlapped so that there are approximately 30 such chain lengths in a width of the chamber of the order of 30 inches.

As shown there are four such curtains 49 each including two layers of the chain. This number can of course be modified in accordance with the requirements but the above practical example has proven to provide an effective filtration action. In particular the chain filter has been found to surprisingly extract the majority of the dust or particles from the air and more importantly the majority of the moisture. The extraction of the moisture is particularly important since the second chamber can use fabric type filters for extracting the remaining particles from the air but these are only usable when the air is effectively dried since otherwise the fabric becomes rapidly clogged with the moisture. The chain filter has been found to rapidly extract the moisture and to collect the moisture on the chains, this allows the use of the fabric filter arrangements of a conventional nature in the chamber 31 without the difficulties of the collection of excess moisture within the chamber 31.

The chains are connected in the chamber 30 only at the upper end so that the chains are freely suspended and free to swing and to dance within the chamber upon movement of the chamber. In the normal situation, the vehicle is stationary while the vacuum effect is carried out but when completed the vehicle is transported from one site to another to effect further cleaning action. As the chamber 30 is rigidly attached to the tank 20 and the tank is carried rigidly on the frame of the vehicle, transportation of the vehicle causes bouncing of the frame and thus dancing of the chains within the chamber 30. this dancing of the chains has been found to release the collected materials on the chain including the dust and the moisture so that these materials fall to the lower surface 35 for collection thereon.

Furthermore, as shown in FIG. 6, when the main storage tank 20 is tilted, the chambers 30 and 31 are similarly tilted. Each chamber has a discharge door 60 at its rearward end adjacent the lower surface 35. This tilting effect therefore as shown in FIG. 6 allows the chains to remain vertical so that they move away from the lower surface 35 so the material 61 dropped from the chains by the dancing action onto the lower surface 35 slides along the lower surface 35 to the discharge opening 62 at the door 60. The material is thus discharged from the rear wall 63 of the chamber 30 through the opening 62 with the door 60 open. At the same time, if necessary, an operator can wash down the chamber simply by injecting water into the chamber and washing down each of the chains. In many cases, however, this is not necessary and the simple dancing action of the chains in the transportation of the vehicle causes the chains to become sufficiently clear of the collected materials to remain effective in the filter action.

In an alternative arrangement (not shown), the chamber 30 can be divided into two such chambers having a central horizontal dividing wall. Each such chamber therefore has a plurality of chain curtains arranged along its length and the ducting is arranged to transmit the air firstly through one of the chambers and then subsequently through a second of the chambers to provide an increased filter action. Each of the chambers can be separately discharged by the tilting action with each chamber having a separate discharge door at the rear.

While one embodiment of the present invention has been described in the foregoing, it is to be understood that other embodiments are possible within the scope of the invention. The invention is to be considered limited solely by the scope of the appended claims.

I claim:

1. Apparatus for filtering air comprising a duct, means for propelling the air along the duct to flow from a feed end to a discharge end and a plurality of air permeable curtains arranged at spaced positions along the duct, each curtain extending across the duct so that the air flowing along the duct passes through the curtain, each curtain comprising a plurality of lengths of chain with one end of each length supported in the duct in a row of said one ends and said lengths extending from said one ends in a direction across the duct, the lengths being connected to the duct only at said one end with said one end uppermost so that the other end of each length is free and the length is suspended vertically.

2. The apparatus according to claim 1 including means for cleaning filtered material from the curtain comprising means mounting the lengths for vibration thereof such that filtered material collected on the lengths falls to a bottom wall of the duct.

3. Apparatus for filtering air comprising a duct, means for propelling the air along the duct to flow from a feed end to a discharge end and a plurality of air permeable curtains arranged at spaced positions along the duct, each curtain extending across the duct so that the air flowing along the duct passes through the curtain, each curtain comprising a plurality of lengths of chain with one end of each length supported in the duct in a row of said one ends and said lengths extending from said one ends in a direction across the duct, the lengths being connected to the duct only at said one end with said one end uppermost so that the other end of each length is free and the length is suspended vertically to said other end at a position closely adjacent a bottom wall of the duct, means for cleaning filtered material from the curtain comprising means mounting the lengths for vibration thereof such that filtered material collected on the lengths falls to the bottom wall of the duct and means for discharging the collected filtered material comprising tilt means for tilting the duct such that the bottom wall is inclined to cause the collected filtered material to slide along the bottom wall to a discharge end thereof, the free end of the lengths being arranged such that the tilting of the duct causes the free other ends to tilt away from the bottom wall to allow the collected filtered material to slide along the bottom wall.

4. The apparatus according to claim 3 wherein said one end of each length is connected to a top wall of the duct such that at least some of the lengths extend from the top wall to the bottom wall.

5. The apparatus according to claim 3 wherein the lengths are arranged such that said one ends are arranged with said one end of one length mounted at a position higher than said one end of a next adjacent length allowing the lengths to be slightly overlapped.

6. The apparatus according to claim 3 including mounting means for mounting the lengths on a top wall of the duct, the mounting means comprising an inverted U-shaped channel member defining two parallel depending flanges with a first curtain attached to one flange and a second curtain attached to a second flange.

7. A vacuum truck comprising a truck frame mounted on ground wheels, a vacuum pump mounted on the truck frame for generating an air flow through the pump to form a vacuum inlet on one side of the pump and an air outlet on an opposed side of the pump, a vacuum hose for communicating vacuum air flow from the vacuum inlet of the pump to a material to be vacuumed at an inlet end of the vacuum hose, a storage tank having an air inlet connected to an outlet end of the vacuum hose for extracting the material from the vacuum air flow and air outlet, and an air filter connected between the air outlet of the storage tank and the vacuum inlet of the pump for extracting particles and moisture from the air prior to passage through the pump, the air filter comprising a duct arranged such that the pump causes flow of the air along the duct from a feed end to a discharge end and a plurality of air permeable curtains arranged at spaced positions along the duct, each curtain extending across the duct so that the air flowing along the duct passes through the curtain, each curtain comprising a plurality of lengths of chain with one end of each length supported in the duct in a row of said one ends and said lengths extending from said one ends in a direction across the duct.

8. The vacuum truck according to claim 7 wherein the lengths are connected to the duct only at said one end with said one end uppermost so that the other end of each length is free and the length is suspended vertically with the other end of the lengths in contact with or closely adjacent a bottom of the duct.

9. The vacuum truck according to claim 8 wherein the bottom of the duct comprises a substantially horizontal bottom wall and wherein there is provided means for cleaning filtered material from the curtain comprising means mounting the lengths for vibration thereof such that said filtered material collected on the lengths falls to the bottom wall of the duct and means for discharging the collected materials comprising tilt means for tilting the duct such that the bottom wall is inclined to cause the collected materials to slide along the bottom wall to a discharge end thereof, the free end of the lengths being arranged such that, the tilting of the duct causes the free ends to tilt away from the bottom wall to allow the collected materials to slide along the bottom wall.

10. The vacuum truck according to claim 9 wherein said one end of each length is connected to a top wall of the duct such that at least some of the lengths extend from the top wall to the bottom wall.

11. The vacuum truck according to claim 9 wherein the lengths are arranged such that said one end of one length is mounted at a position higher than said one end of a next adjacent length allowing the lengths to be slightly overlapped.

12. The vacuum truck according to claim 9 including mounting means for mounting the lengths on a top wall of the duct, the mounting means comprising an inverted U-shaped channel member defining two parallel depending flanges with a first curtain attached to one flange and a second curtain attached to a second flange.

13. The vacuum truck according to claim 9 wherein the storage tank comprises a generally cylindrical tank arranged longitudinally of the truck frame and where the duct is mounted along one side of the tank.

14. The vacuum truck according to claim 13 wherein said tank and said duct are mounted for common tilting movement for simultaneous discharge of the material from the tank and the filtered material from the duct.

15. The vacuum truck according to claim 13 wherein the duct has a horizontal top wall adjacent a top of the tank and said horizontal bottom wall adjacent a bottom of the tank and wherein some of the lengths extend vertically downwardly from the top wall to the bottom wall and some of the lengths are of reduced length so as to extend from the top wall to a bottom end contacting an outside surface of the cylindrical storage tank.

16. The vacuum truck according to claim 7 including means for cleaning filtered material from the curtain comprising means mounting the lengths for vibration thereof such that said filtered material collected on the lengths falls to the bottom of the duct.

17. The apparatus according to claim 9 wherein the duct is rigidly mounted on the truck frame such that vibration of the truck frame caused by traveling of the truck over the ground is arranged to vibrate the lengths to release the filtered material therefrom for collection at the bottom of the duct.

18. The vacuum truck according to claim 7 wherein the lengths are arranged such that said one end of one length is mounted at a position higher than said one end of a next adjacent length allowing the lengths to be slightly overlapped.

19. The vacuum truck according to claim 7 including mounting means for mounting the lengths on a top wall of the duct, the mounting means comprising an inverted U-shaped channel member defining two parallel depending flanges with a first curtain attached to one flange and a second curtain attached to a second flange.

20. The vacuum truck according to claim 7 wherein the storage tank comprises a generally cylindrical tank arranged longitudinally of the truck frame and where the duct is mounted along one side of the tank.

* * * * *